United States Patent Office 2,844,435
Patented July 22, 1958

2,844,435
PROCESS FOR PREPARING POLYSILOXANES

George H. Wagner, Clarence, N. Y., and Charles E. Erickson, New Brunswick, N. J., assignors to Union Carbide Corporation, a corporation of New York No Drawing. Application April 25, 1955
Serial No. 503,779

2 Claims. (Cl. 23—14)

This invention relates to a process for the anhydrous condensation of substituted silanes, to form polysiloxanes. More particularly, the invention relates to a process for preparing polysiloxanes which comprises heating a substituted silane, containing only hydrogen, chlorine and alkoxy groups bonded to the silicon atom thereof, in the presence of a catalyst, to its boiling temperature.

The starting materials employed in the present invention are substituted silanes which can be represented graphically by the formula:

where R represents an alkyl group, such as methyl, ethyl, propyl and the like groups, while Y represents either a chlorine atom or an alkoxy group. Thus our starting materials include dialkoxychlorosilane and alkoxydichlorosilane.

In accordance with our invention the polysiloxanes are prepared by heating a substituted silane containing only hydrogen, chlorine and alkoxy groups bonded to the silicon atom thereof, in the presence of aluminum or boron trichloride, to its boiling temperature. The reaction may be depicted by the following equations where dialkoxychlorosilane is employed as the starting material in one instance and where alkoxydichlorosilane is the starting material in the other:

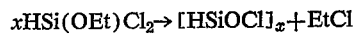

The process may be carried out by placing a substituted silane, such as alkoxydichlorosilane and a catalyst, such as aluminum chloride, in a flask connected to a reflux column and heating the mixture to its boiling temperature under reflux conditions. An alkylchloride is evolved and heating is continued until evolution ceases. The product is a polysiloxane containing hydrogen and chlorine atoms bonded to the silicon atoms thereof.

Example I

To a 100 cc. of HSi(OEt)₂Cl was added 0.1 g. of AlCl₃, and the mixture was heated to reflux (about 110° C.) for 2 hours. Ethyl chloride and ethyl ether were evolved during the refluxing, and a white solid was formed which was found, by analyses for H, Si and C, to have essentially the empirical formula [HSiO₁.₅]ₓ.

The present application is a continuation-in-part application of our copending application Serial No. 106,972, filed July 26, 1949, now Patent No. 2,731,485.

What is claimed is:

1. A process for preparing hydrogen-containing polysiloxanes which comprises heating substituted silanes of the type:

where R is an alkyl radical and Y is a radical taken from the group consisting of chlorine atoms and alkoxy groups, in the presence of a catalyst taken from the group consisting of the chlorides of aluminum and boron to its boiling temperature under reflux conditions and when Y is a chlorine atom recovering a siloxane polymer having the repeating unit:

and when Y is an alkoxy group recovering a siloxane polymer having the repeating unit:

2. A process for preparing hydrogen-containing polysiloxanes which comprises heating substituted silanes of the type:

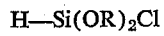

where R is an alkyl radical, in the presence of a catalyst taken from the group consisting of the chlorides of aluminum and boron to a temperature of at least that required for reflux and recovering a siloxane polymer having the repeating unit:

from the reaction product.

References Cited in the file of this patent
UNITED STATES PATENTS

| | | |
|---|---|---|
| 2,458,703 | Hatcher | Jan. 11, 1949 |
| 2,485,928 | Servais | Oct. 25, 1949 |
| 2,559,167 | Myers | July 3, 1951 |
| 2,618,646 | Hatcher et al. | Nov. 18, 1952 |

FOREIGN PATENTS

| | | |
|---|---|---|
| 476,174 | Belgium | Oct. 31, 1947 |
| 478,117 | Belgium | Jan. 31, 1948 |

OTHER REFERENCES

Calingaert: "Jour. Am. Chem. Soc.," vol. 62 (1940), pages 1107–1110.